US012292886B2

(12) United States Patent
Beresniewicz et al.

(10) Patent No.: US 12,292,886 B2
(45) Date of Patent: May 6, 2025

(54) ESTIMATING QUERY EXECUTION PERFORMANCE USING A SAMPLED COUNTER

(71) Applicant: Oracle International Corporation, Redwood Shores, CA (US)

(72) Inventors: John Mark Beresniewicz, Half Moon Bay, CA (US); Kusumaharanadh Poduri, Mountain House, CA (US)

(73) Assignee: Oracle International Corporation, Redwood Shores, CA (US)

(*) Notice: Subject to any disclaimer, the term of this patent is extended or adjusted under 35 U.S.C. 154(b) by 122 days.

(21) Appl. No.: 17/580,071

(22) Filed: Jan. 20, 2022

(65) Prior Publication Data

US 2023/0229659 A1 Jul. 20, 2023

(51) Int. Cl.
*G06F 16/245* (2019.01)
*G06F 11/30* (2006.01)
*G06F 11/34* (2006.01)
*G06F 16/2453* (2019.01)

(52) U.S. Cl.
CPC .... *G06F 16/24542* (2019.01); *G06F 11/3075* (2013.01); *G06F 11/3419* (2013.01)

(58) Field of Classification Search
None
See application file for complete search history.

(56) References Cited

U.S. PATENT DOCUMENTS

| | | | |
|---|---|---|---|
| 7,292,961 B2 | 11/2007 | Dias et al. | |
| 7,376,682 B2 | 5/2008 | Ramacher et al. | |
| 7,526,409 B2 | 4/2009 | Ramacher et al. | |
| 7,555,499 B2 | 6/2009 | Shah et al. | |
| 7,603,340 B2 | 10/2009 | Ngai et al. | |
| 7,664,798 B2 | 2/2010 | Wood et al. | |
| 7,664,847 B2 | 2/2010 | Colrain et al. | |
| 7,673,291 B2 | 3/2010 | Dias et al. | |
| 7,774,312 B2 | 8/2010 | Ngai et al. | |
| 7,873,606 B2 | 1/2011 | Dias et al. | |
| 8,024,301 B2 | 9/2011 | Dias et al. | |
| 8,095,514 B2 | 1/2012 | Beresniewicz et al. | |
| 8,458,530 B2 | 6/2013 | Kini et al. | |
| 8,732,534 B2 | 5/2014 | Kini et al. | |
| 9,116,901 B2 | 8/2015 | Bostock | |
| 9,477,692 B2 | 10/2016 | Beresniewicz et al. | |
| 9,633,061 B2 | 4/2017 | Shaft et al. | |
| 10,169,711 B1* | 1/2019 | Dean | H04L 67/535 |
| 2003/0014399 A1* | 1/2003 | Hansen | G06F 16/951 |
| 2005/0055383 A1* | 3/2005 | Dias | G06F 16/217 |
| 2005/0120000 A1* | 6/2005 | Ziauddin | G06F 16/24549 |

(Continued)

*Primary Examiner* — Augustine K. Obisesan
(74) *Attorney, Agent, or Firm* — Invoke

(57) ABSTRACT

Techniques are described herein for probabilistic monitoring of high-frequency, low-latency database queries. In some embodiments, a probabilistic query monitoring system periodically samples active database sessions. For example, the system may generate sample data every one second or at some other sampling rate for each database session that is currently active. The sample data may include a mapping between query identifiers to sample counter values that are extracted at different sample intervals. The system may then estimate performance metrics for the set of active database based on the counter values sampled across consecutive sample intervals.

20 Claims, 6 Drawing Sheets

(56) References Cited

U.S. PATENT DOCUMENTS

| | | | |
|---|---|---|---|
| 2006/0136370 A1* | 6/2006 | Buckler | G06F 11/3452 |
| 2007/0083564 A1* | 4/2007 | Ramacher | G06F 16/217 |
| 2007/0174256 A1* | 7/2007 | Morris | G06F 16/2462 |
| 2008/0133454 A1* | 6/2008 | Markl | G06F 16/24539 |
| 2009/0018992 A1* | 1/2009 | Zuzarte | G06F 16/24542 |
| 2010/0235349 A1* | 9/2010 | Kuno | G06F 16/217 |
| | | | 707/718 |
| 2011/0035366 A1* | 2/2011 | Warshawsky | G06F 16/2358 |
| | | | 707/705 |
| 2011/0040733 A1* | 2/2011 | Sercinoglu | G06F 16/951 |
| | | | 707/E17.014 |
| 2013/0097119 A1* | 4/2013 | Zeng | G06F 11/3409 |
| | | | 707/754 |
| 2015/0278304 A1* | 10/2015 | Konik | G06F 16/24542 |
| | | | 707/718 |
| 2016/0110417 A1* | 4/2016 | Lakshminarayan | G06F 16/196 |
| | | | 707/718 |
| 2017/0004173 A1* | 1/2017 | Simitsis | G06F 16/24542 |
| 2018/0121856 A1* | 5/2018 | Song | G06Q 10/06393 |
| 2019/0108248 A1* | 4/2019 | Rajan | G06F 16/2272 |
| 2020/0356462 A1* | 11/2020 | Anand | G06F 11/3495 |

* cited by examiner

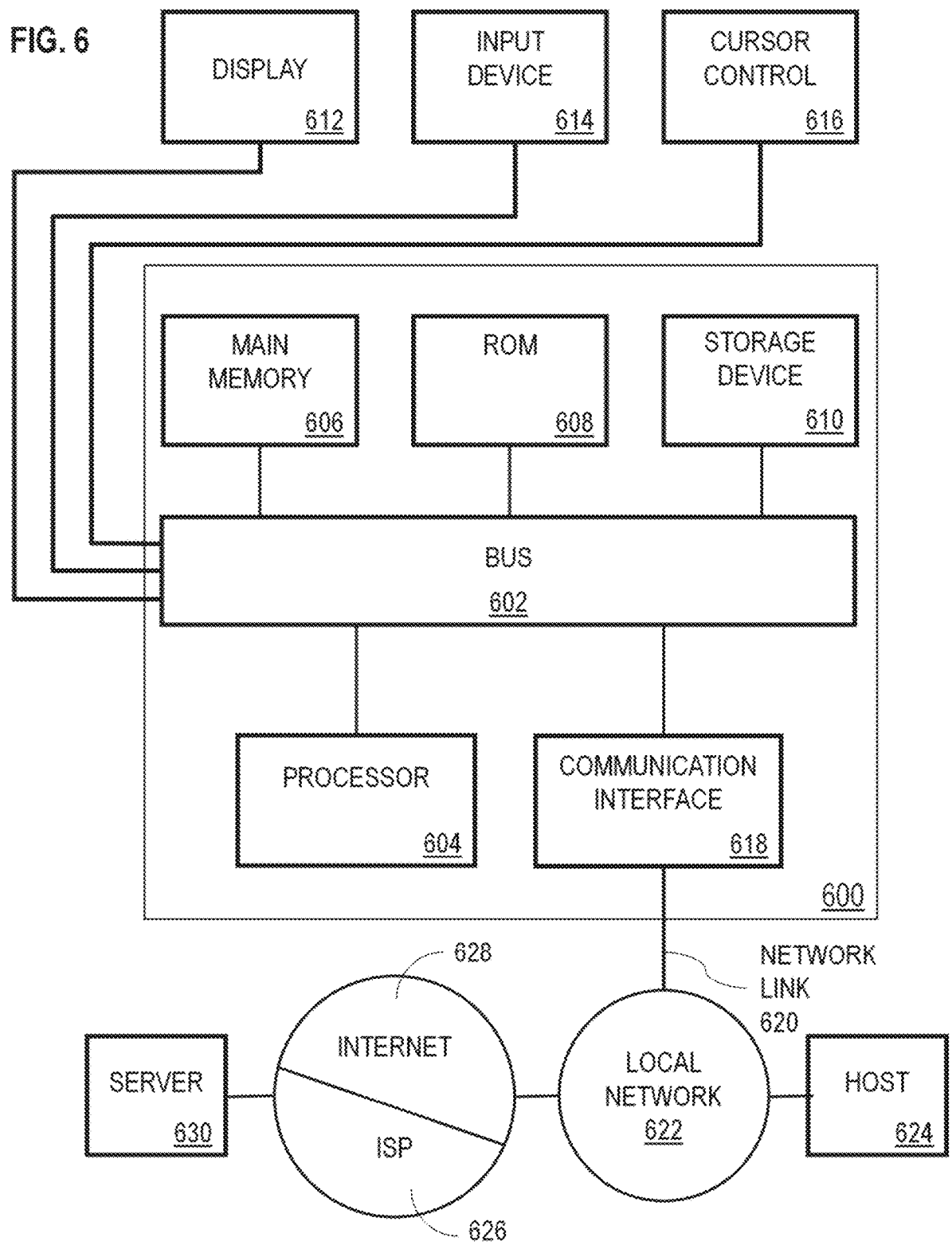

ESTIMATING QUERY EXECUTION PERFORMANCE USING A SAMPLED COUNTER

RELATED APPLICATIONS; INCORPORATION BY REFERENCE

This application is related to (1) U.S. Pat. No. 7,292,961, entitled "CAPTURING SESSION ACTIVITY AS IN-MEMORY SNAPSHOTS USING A TIME-BASED SAMPLING TECHNIQUE WITHIN A DATABASE FOR PERFORMANCE TUNING AND PROBLEM DIAGNOSIS"; (2) U.S. Pat. No. 7,376,682, entitled "TIME MODEL"; (3) U.S. Pat. No. 9,477,692, entitled "SYSTEMS AND METHODS FOR APPLYING AN ANALYTICAL MODEL TO PERFORMANCE ANALYSIS"; (4) U.S. Pat. No. 7,526,409, entitled "AUTOMATIC PERFORMANCE STATISTICAL COMPARISON BETWEEN TWO PERIODS"; (5) U.S. Pat. No. 7,603,340, entitled "AUTOMATIC WORKLOAD REPOSITORY BATTERY OF PERFORMANCE STATISTICS"; (6) U.S. Pat. No. 7,555,499, entitled "DIAGNOSING DATABASE PERFORMANCE PROBLEMS USING A PLURALITY OF WAIT CLASSES"; (7) U.S. Pat. No. 7,774,312, entitled "SELF-MANAGING PERFORMANCE STATISTICS REPOSITORY FOR DATABASES"; (8) U.S. Pat. No. 8,095,514, entitled "TREEMAP VISUALIZATIONS OF DATABASE TIME"; (9) U.S. Pat. No. 9,116,901, entitled "DATABASE SNAPSHOT ANALYSIS"; (10) U.S. Pat. No. 8,024,301, entitled "AUTOMATIC DATABASE DIAGNOSTIC USAGE MODELS; (11) U.S. Pat. No. 9,633,061, entitled "METHODS FOR DETERMINING EVENT COUNTS BASED ON TIME-SAMPLED DATA"; (12) U.S. Pat. No. 8,458,530, entitled "CONTINUOUS SYSTEM HEALTH INDICATOR FOR MANAGING COMPUTER SYSTEM ALERTS"; (13) U.S. Pat. No. 7,664,847, entitled "MANAGING WORKLOAD BY SERVICE"; (14) U.S. Pat. No. 7,673,291, entitled "AUTOMATIC DATABASE DIAGNOSTIC MONITOR ARCHITECTURE"; (15) U.S. Pat. No. 7,664,798, entitled "DATABASE PERFORMANCE BASELINES"; (16) U.S. Pat. No. 7,873,606, entitled "ADVISOR FRAMEWORK SYSTEMS, METHODS AND SOFTWARE FOR IMPLEMENTING THE SAME"; and (17) U.S. Pat. No. 8,732,534, entitled "PREDICTIVE INCIDENT MANAGEMENT"; the entire contents for each of which are incorporated by reference as if set forth in their entirety.

TECHNICAL FIELD

The present disclosure relates to database and query processing systems. In particular, the present disclosure relates to techniques for efficiently monitoring query performance, detecting performance degradation, and tuning databases.

BACKGROUND

Online transaction processing (OLTP) systems are generally tasked with executing database queries at a high frequency for multiple sessions on behalf of several different users. In such environments, database administrators and developers are often interested in monitoring query executions to detect any significant performance degradation. Quickly identifying and correcting the root cause of poor query performance may significantly improve the quality of service, responsiveness, and reliability of OLTP-based applications.

The high frequency at which OLTP systems receive and execute queries complicates the ability to effectively monitor query performance. Performing monitoring operations for every single query execution is computationally expensive and may negatively impact performance within the OLTP system. Another approach is for administrators to track specified queries of interest over a particular window of time. However, this approach requires advanced knowledge of which database queries to monitor. Administrators may not be able to quickly adapt to changes in high-frequency query workloads. As a result, significant poorly performing queries may be overlooked and failed to be addressed in a timely manner.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram that illustrates a computer system in accordance with one or more embodiments.

DETAILED DESCRIPTION

Figure 1:
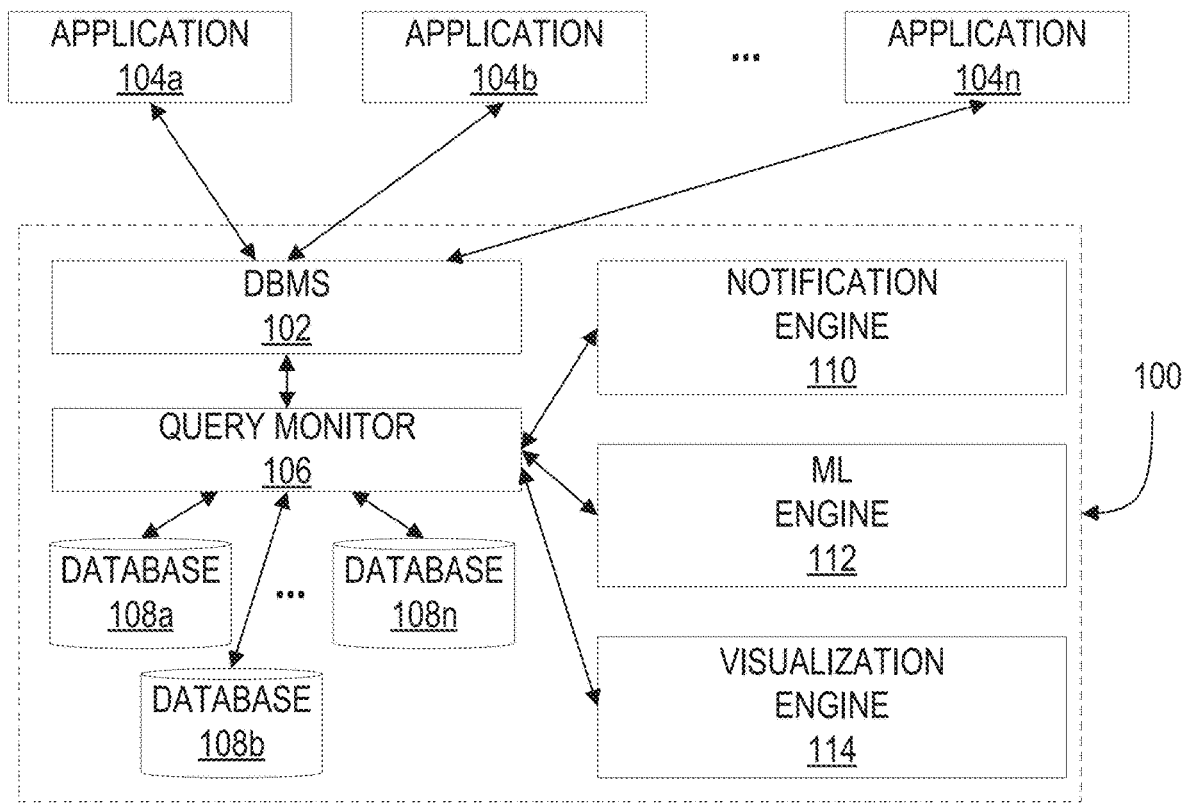
FIG. 1 illustrates a database system in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. PROBABILISTIC PERFORMANCE ESTIMATES
3.1 SAMPLING PROCESS OVERVIEW 3.2 ESTIMATING OLTP SQL EXECUTION FREQUENCIES
3.3 ESTIMATING OLTP SQL LATENCY
4. EXAMPLE APPLICATIONS USING PROBABILISTIC PERFORMANCE ESTIMATES
    4.1 ENRICHING SAMPLED SQL EXECUTION DATA WITH NON-SAMPLED DATA
    4.2 INTERACTIVE VISUALIZATIONS AND ANALYTICS
    4.3 TUNING HINTS AND OPTIMIZATIONS
    4.4 MACHINE-LEARNING APPLICATIONS
5. COMPUTER NETWORKS AND CLOUD NETWORKS
6. HARDWARE OVERVIEW
7. MISCELLANEOUS; EXTENSIONS

1. General Overview

Techniques are described herein for probabilistic monitoring of database queries. The techniques may be applied to high-frequency query processing systems, such as online transaction processing (OLTP) systems, to quickly identify performance degradation in low-latency, high-frequency queries. The techniques allow for problematic queries to be quickly identified at runtime without requiring monitoring every single query execution within a system. The techniques further allow non-performant queries to be identified without requiring advance knowledge of human administrators of which queries are likely to be relevant to monitoring operations. Embodiments described herein also allow for (a) adaptive changing to high-frequency query workloads such that new database queries (or portions of a query) that are experiencing degrading performance are automatically detected, (b) estimating current query performance metric values without the need to save prior query performance metric state information, and (c) providing recent performance metric history snapshots for database queries or portions thereof. The monitoring data may be used to identify which queries or portions thereof are causing problems within a database system and to address the underlying causes, which may significantly improve runtime performance.

In some embodiments, a probabilistic query monitoring system periodically samples active database sessions. For example, the system may generate sample data every one second or at some other sampling rate for each database session that is currently active. The sample data may include a mapping between query identifiers being executed by sessions and the execution counters for those query identifiers. These query identifier-to-execution counter mappings over time are then used to estimate performance metrics for the set of active database queries sampled across the different sample intervals.

Monitoring execution counter values of active database queries using sampled active session state allows query performance metrics to be estimated with relatively little computational overhead. A query execution engine may increment a counter value during each query execution by active sessions and save this information in session state with negligible impact on query execution times. The more database sessions that execute a given query the more likely that executions counter values for that query will be sampled from active session state. Thus, more active queries will be sampled more often. Further, the probability that an active database query is sampled increases with the execution time of the query. Thus, queries that have the largest potential performance impact on a database system are most likely to be profiled with the sampling techniques described herein.

In addition, the system may avoid or reduce the computational overhead associated with profiling low impact but high frequency queries.

In some embodiments, the system monitors the performance metric estimates associated with the sampled data to detect performance degradation. For example, the system may monitor the performance metrics for an active database query to determine whether the metrics fail to satisfy one or more performance thresholds. If so, then the system may generate an alert to notify an administrator of the non-performant query. Additionally or alternatively, the system may perform other actions to correct or otherwise address the performance degradation.

One or more embodiments described in this Specification and/or recited in the claims may not be included in this General Overview section.

2. Architectural Overview

Embodiments described herein may be implemented within or on behalf of systems that execute high volumes of queries such as an Online Transaction Processing (OLTP) system. OLTP systems include software and/or hardware tools for managing transaction-oriented applications. OLTP applications often support multiple concurrent database sessions representing many different and independent users, allowing multiple transactions to be processed in parallel. Large-scale OLTP applications may be characterized by high frequency executions of several queries to update data and metadata in an OLTP-oriented database.

A database used by an OLTP system may generally comprise an organized collection or set of data stored on computer readable storage media. A database may be administered and controlled by a database management system (DBMS). The DBMS may provide a set of functions for administering the database including monitoring, managing, and responding to queries about the data. A database system may refer to the data, the data repository storing the data, the metadata defining how the data is structured, the DBMS, and applications that submit queries to access the data.

Databases in OLTP systems may be implemented using a relational model (RM) for database management. The RM is an approach to managing data using a tabular structure and language consistent with first-order predicate logic. Relational databases may use a domain-specific language, such as the Structured Query Language (SQL), to approximate the RM in a consistent and accessible manner. Many examples provided herein relate to SQL-based database queries. However, the techniques may be applied to queries conforming to other query languages or formats.

SQL statements may be used to build requests for managing and/or accessing data stored in a relational database. Example SQL statements include data manipulation language (DML) statements, which include a syntax for adding, deleting, and/or otherwise modifying data in a database, and data definition language (DDL) statements, which include a syntax for creating and modifying database objects such as tables, schemas, and user control objects. As used herein, a request which uses SQL statements may be referred to as a "SQL request" or simply a request or query, when used in conjunction with a relational database or other type of database. SQL statements may be assigned an identifier (SQL_ID) that uniquely identifies the SQL text such that different queries are distinguishable by their assigned SQL_ID. For example, a SQL_ID may be hash value obtained by applying a hash function to the text of a SQL statement. As described further herein, the DBMS may maintain execution counters and other performance metrics at the SQL_ID level.

The data within a database may be accessible in various ways for use in performing one or more functions. The data may be searched, modified, deleted, created, or in some other way manipulated in response to a request to access the database or specific sets of data therein. Database workloads may be related to any number of different requests to access the data, and similar requests to access data may result in similar infrastructure resource usage to fulfill the similar requests.

FIG. 1 illustrates database system 100 according to some embodiments. As illustrated in FIG. 1, system 100 includes DBMS 102 electronically and/or communicatively coupled with a plurality of databases 108 (e.g., database 108a, database 108b, . . . , database 108n) and query monitor 106. One or more applications 104 (e.g., application 104a, application 104b, . . . , application 104n) are electronically and/or communicatively coupled with the DBMS 102 to access data stored to the databases 108. In some embodiments, one or more of applications 104 may be included in system 100. System 100 further includes notification engine 110, machine-learning (ML) engine 112, and visualization engine 114, which may consume data provided by query monitor 106 to perform various tasks.

Accessing data may include reading, writing, deleting, and/or modifying a file, register, parameter, or some other data structure stored to any of databases 108. To access data in databases 108, an application (e.g., application 104a) issues a query or set of queries corresponding to specific data that may reside in one or more of databases 108. The query or set of queries is processed by DBMS 102, which access the data in a manner that satisfies the issued query commands and/or criteria.

Query monitor 106 monitors queries issued to the DBMS 102 and/or queries executed by the DBMS 102 on one or more of the databases 108. Query monitor 106 may be included in in DBMS 102 or may be implemented as a separate component. In some embodiments, query monitor 106 is implemented within a workload manager. Additionally or alternatively, query monitor 106 may be distributed across multiple DBMS nodes, may be a client application executing on one or more computer systems within system 100, or may be implemented as one or more background processes, such as daemons. In some embodiments, query monitor 106 is configured to detect and sample active database sessions at sample intervals, the length of which may be configurable by an end user and vary depending on the particular implementation.

In some embodiments, a database (e.g., database 108a, database 108b, . . . , database 108n) is any type of storage unit and/or device (e.g., a file system, data repository, collection of tables, or any other storage mechanism) for storing data. Further, a database may include multiple different storage units and/or devices. The multiple different storage units and/or devices may or may not be of the same type or located at the same physical site. Further, a database may be implemented or may execute on the same computing system as DBMS 102 and/or query monitor 106. Alternatively or additionally, a database may be implemented or executed on a computing system separate from DBMS 102 and/or query monitor 106. A database may be communicatively coupled to DBMS 102 via a direct connection or via a network. Information describing queries issued to DBMS 102 and/or executed by the DBMS 102 on databases 108a-n may be implemented across any of components within the system 100.

In some embodiments, query monitor 106 estimates performance metrics for active database queries. Notification engine 110, ML engine 112, and/or visualization engine 114 may consume the performance estimates to perform various tasks. For example, notification engine 110 may allow administrators, developers, and/or other users to register with system 100 to receive notifications if query performance significantly degrades. During the registration process, users may provide an email address, mobile number, social media handle, or registration data that identifies where to send a notification. The user may further define parameters, such as performance thresholds and criteria, that dictate when a notification is triggered. Once registration is complete, notification engine 110 may send an email, short message service (SMS) message, social media post, or other notification to alert the administrator when the notification criteria have been satisfied.

ML engine 112 may consume the query monitoring data to implement self-learning algorithms that extrapolate outcomes and recommendations. ML engine 112 may make inferences and adjustments during application runtime rather than relying on static instruction sets to perform tasks. Thus, system 100 may adapt in real-time to varying and evolving patterns in query performance and execution without requiring additional hard-coding to account for new patterns. For example, ML engine 112 may learn patterns that are indicative that a query's performance is problematic. Rather than relying on a static threshold to trigger alarms, ML engine 112 may generate predictions based on learned behavioral patterns that account for various features, such as the number of active database sessions, the current system load, the characteristics of the query (e.g., the query expressions/sub-expressions included in the query), the percentage change in estimated performance. However, the features used to train and apply ML models may vary depending on the particular implementation.

In some embodiments, visualization engine 114 generates interactive charts and/or other visualizations based on the estimated performance metrics. Visualization engine 114 may render and present the visualizations to an administrator or other user through a graphical user interface, such as an application used to monitor SQL execution performance within system 100. Users may interact with the presented charts and/or other GUI elements to navigate to different views of the data, perform different analytics on query performance, and/or request corrective actions to address problematic queries. Examples of user interface elements include checkboxes, radio buttons, dropdown lists, list boxes, buttons, toggles, text fields, date and time selectors, command lines, sliders, pages, and forms.

In some embodiments, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In some embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, one or more components illustrated in FIG. 1 are implemented in a cloud service or are otherwise accessible via data communication networks, such as the Internet. Components that are remotely located may communicate using one or more communication protocols including those associated with the Internet Protocol (IP) suite. Additional embodiments and/or examples relating to computer networks are described below in Section 5, titled "Computer Networks and Cloud Networks."

3. Probabilistic Performance Estimates 3.1 Sampling Process Overview

In some embodiments, query monitor 106 estimates performance metrics for queries based on a sampled counter. A "probabilistic" or "estimated" performance metric is one that is associated with a level of uncertainty with respect to its accuracy. The level of uncertainty may be determined, in part, based on the length and frequency of query executions in a sampled environment. For example, if query executions take longer than the sampling interval, then the query monitor 106 will detect each execution of the query since execution will be active for at least one sample. However, for query workloads in which many SQL executions have sub-second latency and are much shorter than the sampling interval, only a fraction of total executions will be sampled. Longer events have deterministic visibility and shorter events have probabilistic visibility, with respect to a given sampling rate.

In the latter scenario, the accuracy of estimates using a sampled counter, as described further herein, increases with the execution frequency of low latency queries. Conversely, the level of uncertainty grows with fewer executions since the likelihood of having multiple samples per SQL is reduced. In high-frequency query processing systems, such as OLTP systems, the reduction in accuracy for low-frequency, low-latency queries may be an acceptable tradeoff, as administrators are very interested in queries that execute frequently as degradation in these can have the most performance impact on the system.

Figure 2:
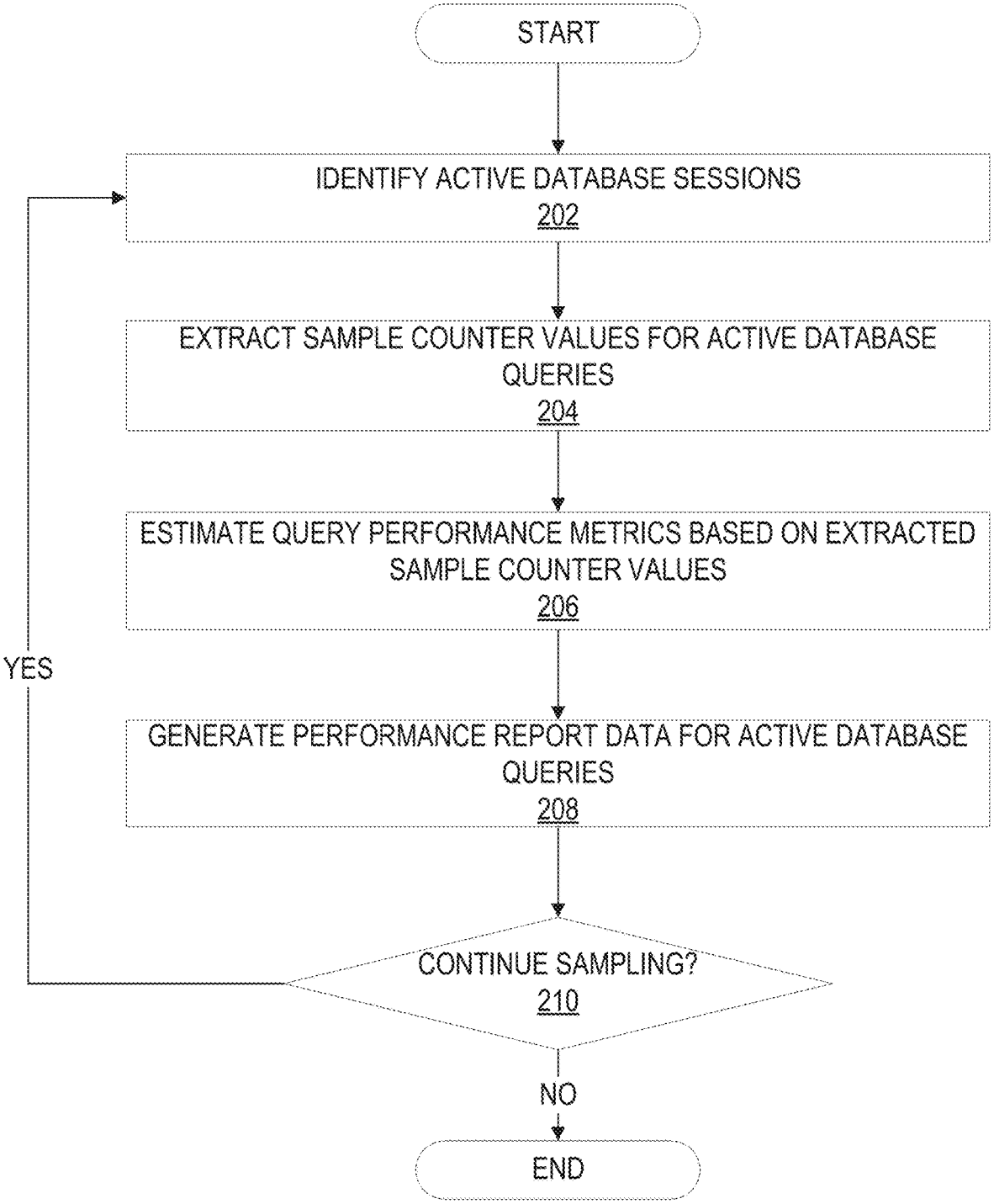
FIG. 2 illustrates an example set of operations for estimating query performance metrics based on a sampled counter in accordance with some embodiments.

FIG. 2 illustrates an example set of operations for estimating query performance metrics based on a sampled counter in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, the process includes identifying one or more active database sessions (operation 202). A database session represents a connection between an application and DBMS 102. Database sessions that are connected may be in an active or idle state. A session may be determined to be active if it is waiting on an event, such as on a central processing unit (CPU) process or thread of execution. A session may be identified as idle if a user is logged in, but the DBMS 102 is not executing queries or other requests at that instant. DBMS 102 may support several concurrent sessions on behalf of different database users, some of which may be active and others of which may be inactive at a given point in time. DBMS 102 may maintain a list of sessions that are currently active based on the requests currently in process. The process may scan the list to identify the database sessions to analyze.

Once the process has identified the active database sessions, the process extracts sample execution counter values for active database queries (operation 204). In some embodiments, the counter values are extracted by sampling an execution counter maintained on a per-SQL basis. DBMS 102 may map SQL identifiers (IDs) to corresponding execution counters. Each time DBMS 102 executes a SQL, DBMS 102 may determine the SQL ID for the query or subcomponent of the query and increment the counter mapped to the SQL ID. The execution counter may then be sampled for each active query at sample intervals.

In some embodiments, DBMS 102 determines a SQL ID for a query by applying a hash function to the SQL statement's text. The resulting hash of the text may then be used as the SQL ID for the SQL statement. DBMS 102 may apply the hash function to the entire text of a query to obtain a hash identifier for the entire query. Additionally or alternatively, DBMS 102 may apply the hash function to query subexpressions to obtain hash identifiers for subcomponents of the query. Thus, subexpressions, such as table joins and other query operations, that are common across different queries may be mapped to the same counter and cause the same counter to be incremented, allowing for analysis at varying levels of granularity.

In some embodiments, a SQL ID may be generated by applying a hash function to a normalized version of a SQL statement. A query may be normalized by removing variables, such as table names and bind variables, from the SQL text. The variables may be replaced by dummy text, such as a predefined character, or removed entirely from the text. Once replaced or otherwise removed, DBMS 102 may apply the hash function to the normalized text to obtain the hash identifier for the SQL statement. With normalization, queries or portions thereof with different variables with text that is otherwise identical may be mapped to the same execution counter. Additionally or alternatively, separate counters may be maintained for the unnormalized query text.

In some embodiments, the process estimates query performance metrics for the active database queries based on the extracted sample counter values (operation 206). For example, the process may estimate the execution frequency and/or average per-execution latency (also referred to as "database time") for a SQL based on differences in the counter values at different sample times. Techniques for estimating the execution frequency and latency of SQL executions is described further below.

In some embodiments, the process generates performance report data for the active database queries (operation 208). The performance report data may include estimated execution counts, execution frequency, and/or execution latency for queries that are currently active within DBMS 102. Additionally or alternatively, the performance report data may include other probabilistic query performance metrics, which may vary depending on the particular implementation. Users may query the performance report data to determine analytic insights into query workloads, such as which queries are having the most significant impact on database performance based on execution frequency and execution latency.

In some embodiments, the process determines whether to continue sampling the execution counters and estimating performance metrics (operation 210). DBMS 102 may generate the sample data continuously or over a specified time period. If sampling is to continue, DBMS 102 may continue generating sample data at a sampling rate, which may be selected by default or defined by a user. For example, DBMS 102 may sample the execution counters at one-second sample intervals by default. The performance report data may be updated periodically as additional sample data is generated.

In some embodiments, the performance report data may be generated on demand based on the sampled execution counter values. Users may submit queries requesting performance estimates for a particular SQL, a subset of SQLs, or for all active SQLs over a specified time range. The performance metrics may be estimated on demand using the sample counter values without the need to maintain other state information for the queries and without requiring the user to know a priori which SQLs to monitor.

3.2 Estimating OLTP SQL Execution Frequencies

As previously indicated, query executions that are longer than the sampling interval have deterministic visibility and executions shorter than the sampling interval have probabilistic visibility. SQL queries that execute quickly may not be "seen" by the sampler since it only "looks" once per sampling interval. However, we can use sampled execution counters to estimate both rates of execution and average latencies for such queries.

With OLTP workloads, many sessions execute the same high-frequency, low-latency queries, and each of the query executions may cause the corresponding counter to be incremented. Therefore, for a given SQL ID, system 100 may estimate the number of executions between any two sampled execution counter values for the same SQL ID, across different database sessions, by subtracting the minimum sampled value from the maximum sampled value and adding one.

System 100 may approximate the execution frequency for a SQL (which may represent an entire query or portion thereof as described previously) by dividing the estimated number of executions by the total elapsed time. For example, a process may read the sample counter value at time $t_2$ mapped to a SQL to determine that there have been 99 executions of the SQL up to that time, and at time $t_5$ to determine that there have at that time been 1000 executions of the SQL. With a one-second sampling interval, the process may compute the frequency as 900 executions divided by 3 seconds (the interval covered by the three samples between the fifth sample at $t_5$ and second sample at $t_2$) for an estimated execution frequency of 300 executions per second. The computation may vary depending on the sampled execution counter values and the length of the sampling interval.

In some embodiments, applications and users may submit queries to DBMS 102 to request estimated execution counts and/or frequencies over a specified time range. For example, the user may request an execution count and/or frequency for a particular SQL over the past five minutes. In response, DBMS 102 may identify the count value sampled five minutes before (or the sample nearest in time to the requested timeframe). DBMS 102 may then subtract this value from the most recently sampled value and add one to estimate the execution count over the past five minutes. DBMS 102 may divide the estimated count by the elapsed time between the two samples to estimate the execution frequency over this time period.

In some embodiments, query monitor 106 may monitor execution counts and/or frequencies in real-time. Query monitor 106 may maintain a sliding window to monitor performance metrics. For example, query monitor 106 may estimate execution counts and/or frequencies for all active queries over the past minute or some other timeframe. The length of the window may vary and be configurable by an administrator or other user. Applications and users may then query the report data to view and track the most recent performance estimates.

3.3 Estimating OLTP SQL Latency

Average latency for a given OLTP SQL ID during a time period may be estimated by dividing the estimated total elapsed time (all sessions) by the estimated total executions (all sessions) for that SQL ID during the given time period. As indicated above, the estimated execution count for a given SQL ID may be computed by subtracting the minimum sampled execution counter value from the maximum sampled execution counter value and adding one. Total elapsed time is estimated using the well-established technique of aggregrating session sampling intervals multiplied by the number of sessions sampled. For example, if active sessions are sampled each second for 30 seconds consecutively and in those samples 12 are for a given SQL ID, then that SQL ID is assigned 12 seconds of estimated elapsed time for that 30 seconds (12 times 1 second.) The elapsed time for a SQL ID is estimated by multiplying the length of the sampling interval by the number of total number of sessions sampled executing that SQL ID between two samples. The process may then divide the resulting estimated total elapsed time by the estimated total execution count to determine the average latency of the SQL ID query between the sample times.

As an example computation, a process may read the sample counter value from active session state at time $t_2$ mapped to a SQL ID to determine that there have been 99 executions of that query up to and including that execution at that time, and at time $t_5$ to determine that there have been 1000 executions of that query mapped to that SQL ID as of that time. Suppose also that in the four activity samples observed at times t2 through t5 that 12 sessions have been sampled for this SQL ID. Assuming a one-second sampling interval, the process may compute the average latency of the SQL as approximately 1.3 milliseconds using 1200 milliseconds for estimated elapsed time and 900 for estimated execution count. The computation may vary depending on the sampled count values and the length of the sampling interval.

In some embodiments, applications and users may submit queries to DBMS 102 to request estimated per-execution latencies over a specified time range. For example, the user may request an average latency for a particular SQL over the past five minutes. In response, DBMS 102 may identify the counter value sampled five minutes before (or the sample nearest in time to the requested timeframe). DBMS 102 may then subtract the value from the most recent sampled counter value and add one to estimate the execution count over last 5 minutes. DBMS 102 may divide the estimated count into the estimated elapsed time between the two samples to estimate the average execution latency.

In some embodiments, query monitor 106 may monitor execution latency in real-time. Query monitor 106 may maintain a sliding window to monitor performance metrics. For example, query monitor 106 may estimate average execution latency for all active queries on a per-SQL ID basis over the past minute or some other timeframe. The length of the window may vary and be configurable by an administrator or other user. Applications and users may then query the report data to view and track the most recent performance estimates.

4. Example Applications Using Probabilistic Performance Estimates

4.1 Monitoring for Performance Degradation

Figure 3:
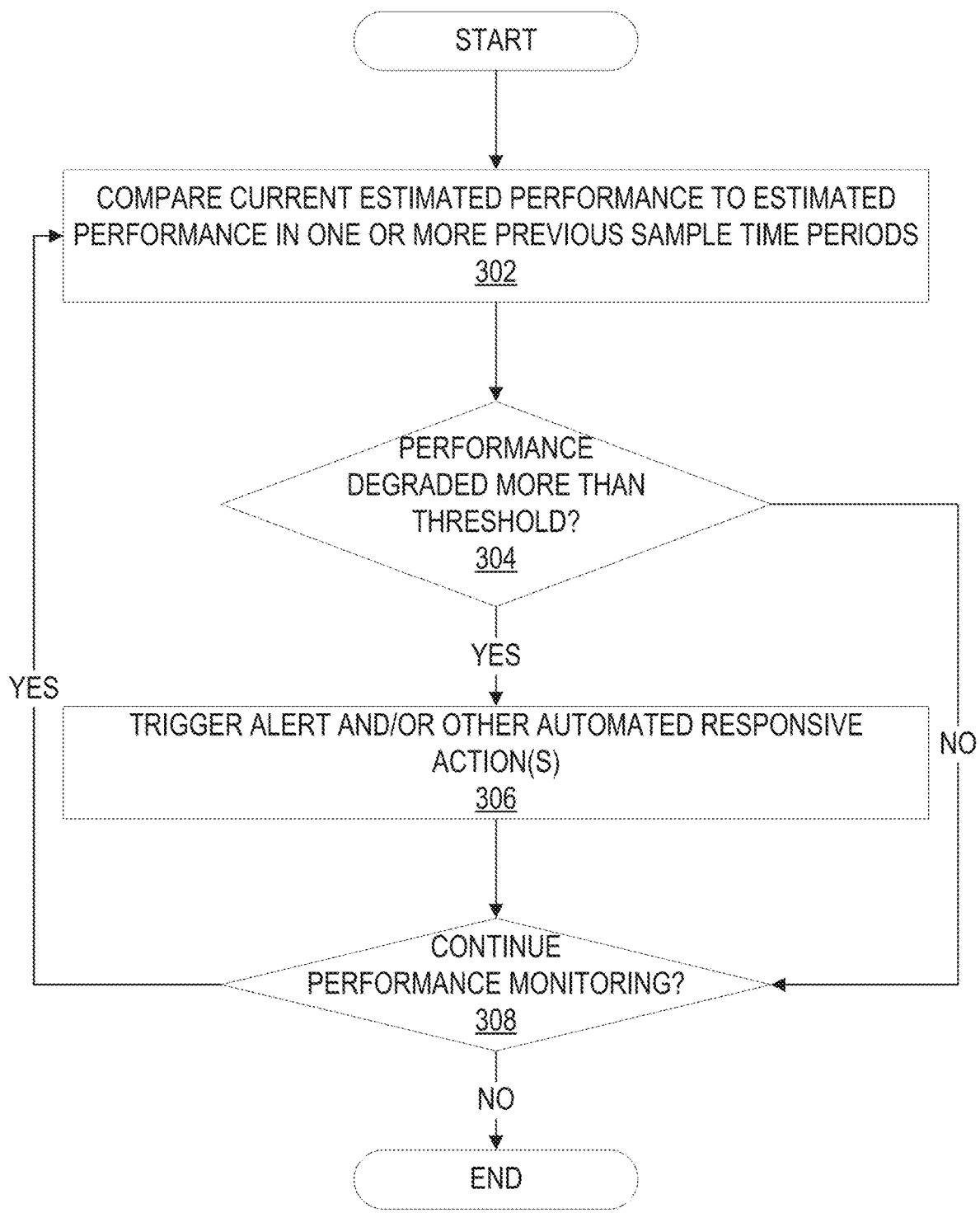
FIG. 3 illustrates an example set of operations for monitoring for performance degradation in sample-based metrics in accordance with some embodiments.

In some embodiments, system 100 may use the probabilistic performance estimates to monitor for query performance degradation. For example, system 100 may analyze the performance estimates over time to detect trends in the performance data, such as degradation in average query execution latency for active database sessions. If performance degradation is detected, then notification engine 110 may send an alert to one or more registered users. The alert may identify the SQL IDs and queries affected by the degradation. The alert may include additional information, such as the trend in performance over a relevant timeframe. The notified user may then take corrective action to address the degradation. Additionally or alternatively, system 100 may automatically take corrective action, such as performing query and database tuning operations FIG. 3 illustrates an example set of operations for monitoring for performance degradation in sample-based metrics in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

Referring to FIG. 3, the process compares the current estimated performance to estimated performance in one or more previous sample time periods (operation 302). For example, the process may compare average latency in the past five minutes to the average latency over the past week or some other timeframe for a SQL ID. To compare, the process may subtract the most recently observed latency average from the historical latency average for the SQL ID. Additionally or alternatively, the process may determine the difference between the average execution frequencies and/or execution counts for the SQL ID. The resulting difference(s) may be compared to one or more performance thresholds.

Based on the comparison, the process determines whether performance has degraded more than a threshold (operation 304). The thresholds may be set such that small variations in the average latency and/or execution frequency do not trigger alerts, as such behavior is generally not atypical in query workloads. However, if the variation becomes statistically significant, such as when the magnitude of the change exceeds a threshold, then the process may flag the performance degradation for further analysis and correction.

In some embodiments, the process triggers an alert and/or one or more other automated responsive actions responsive to determining that the performance of a SQL ID has degraded more than a threshold (operation 306). For example, an alert message may be sent via email, SMS message, social media post, and/or other communication channels based to an administrator using the registered communication handles. The alert may identify information about the queries and/or sub-expressions therein that triggered the alert, including the SQL ID, average latency per execution, average execution frequency, and magnitude of the degradation of the performance metrics compared to historical averages.

The process further determines whether to continue performance monitoring (operation 308). If performance monitoring is to continue, DBMS 102 may continue generating sample data at a sampling rate, which may be selected by default or defined by a user. For example, DBMS 102 may sample the execution counters at one-second sample intervals by default. The performance estimates may be updated and compared to historical averages in real-time as more sample data is received. Monitoring may be run continuously or over a specified timeframe.

4.2 Performance Tuning and Other Actions

In some embodiments, system 100 may automate or facilitate performance tuning operations if performance degradation is detected for one or more SQL IDs. Example tuning operations include providing hints to an optimizer for optimizing a query execution plan, restructuring indexes within a database, restructuring SQL statements, and restructuring the data in the database. The tuning operations may help reduce query execution latency for queries having the greatest impact on performance degradation.

As an example, system 100 may detect a SQL ID that has a high or degrading average per execution latency. A tuning application may attempt to reduce execution time by removing nonselective indexes, indexing performance-critical access paths, or otherwise restructuring indexes to optimize query execution. As another example, the tuning application may restructure the SQL text to use the SQL statement less frequently. In yet another example, hints may be provided to the optimizer that indicate that query performance for the SQL ID have degraded. The optimizer may determine the query execution plan operators used for the SQL ID in the most recent query executions and select a different query execution plan for the SQL ID.

Additionally or alternatively, other operations may be implemented to optimize query performance. For example, queries may be distributed to different database servers based in part on the estimated query execution latencies associated with the queries. A load balancer may assign a database server fewer requests than another server if the requests have a higher average estimated per SQL execution latency. Data may also be migrated, replicated, or consolidated to reduce network latency when executing a database query with a high estimated performance cost.

4.3 Enriching Sampled SQL Execution Data with Non-Sampled Data

In some embodiments, the sample-based performance estimates for a query may be enriched with non-sampled data. Non-sampled data may provide more precise measurements and insights into query performance. However, generating non-sampled data may increase processing overhead. To mitigate the performance impact, system 100 may selectively generate non-sampled data based on the query performance estimates.

Figure 4:
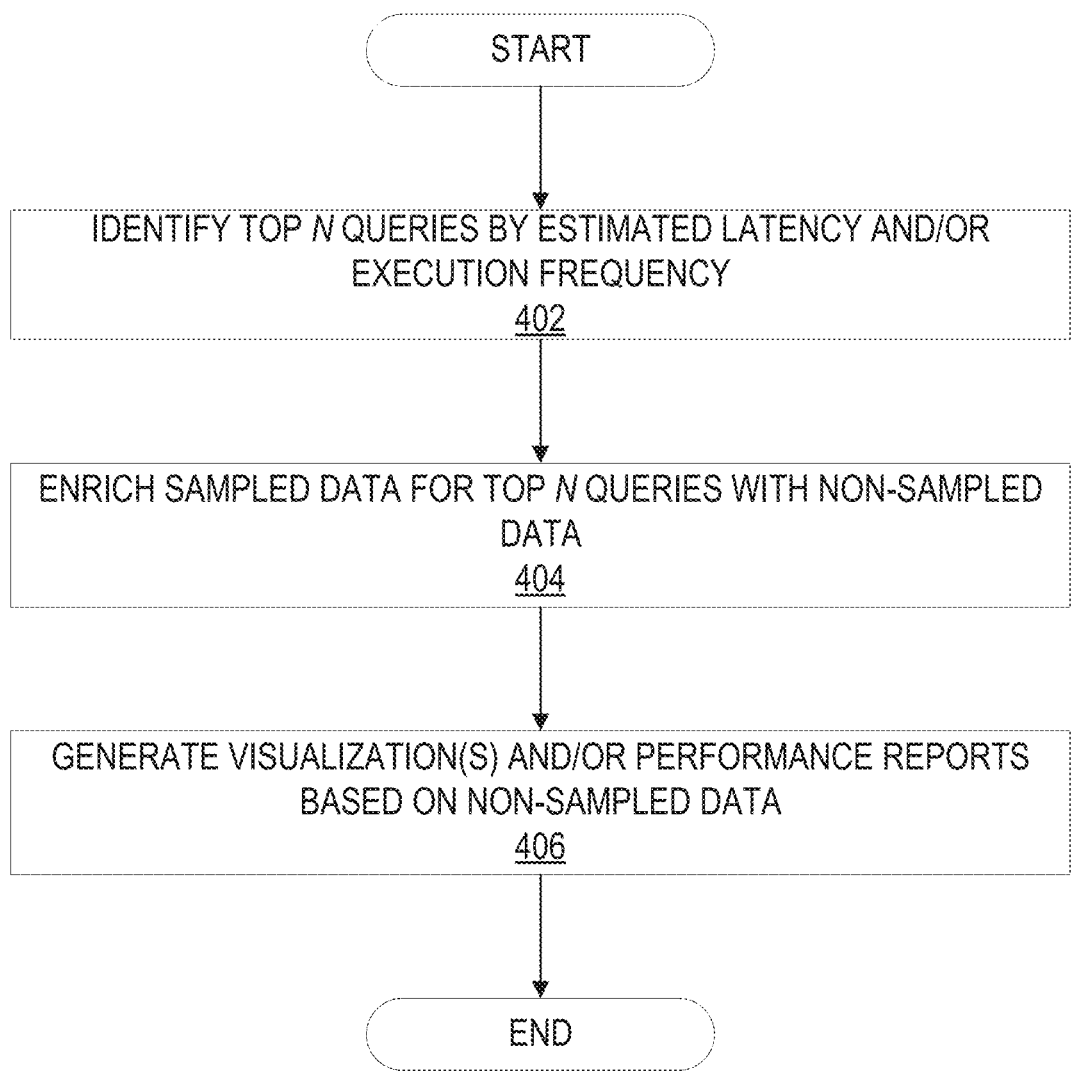
FIG. 4 illustrates an example set of operations for enriching query profile data in accordance with some embodiments.

FIG. 4 illustrates an example set of operations for enriching query profile data in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, the process identifies the top n queries by estimated latency and/or execution frequency (operation 402). For example, the process may rank SQL IDs by average execution latency and filter SQL IDs with an execution count (or frequency) of less than a threshold. The top n queries may then be selected, where n represents a positive integer, such as the top five queries. A default value of n may be selected. In other cases, the value may be provided by an end user.

The process next enriches the sampled data for the top n queries with non-sampled data (operation 404). For example, the process may track non-sampled statistics on per-execution latency for the top n queries. To generate the non-sampled data, the SQL IDs may be registered with DBMS 102, which may trace execution of the queries and generate the execution statistics. During query execution, a tracing application may track execution start time, execution end time, and/or other execution metrics associated with the SQL ID. The non-sampled metrics may be based on direct measurements that are taken independently from the sampled counter. Thus, the non-sampled metrics may be more precise and deterministic than the probabilistic metrics estimated using the sampled counter.

In some embodiments, the process further generates one or more visualizations and/or performance reports based on the non-sampled data (operation 406). For example, the process may generate charts, graphs, lists, and/or other visuals that present non-sampled execution latencies, execution frequencies, and/or performance metrics associated with the top n database queries. Additionally or alternatively, the process may trigger one or more alerts and/or other automated actions based on the non-sampled performance data. For instance, the non-sampled performance data may be monitored and an alert triggered if performance degrades more than a threshold. The non-sampled data may further include other data about query executions, such as the query execution plan used for different query executions and resulting execution times, which may be useful when tuning the database.

4.4 Interactive Visualizations and Analytics

In some embodiments, visualization engine 114 generates one or more interactive visualizations based on the sampled and/or non-sampled query performance data. For example, a front-end user interface application may display and chart query results for a set of active database sessions. The charts may display the top n SQLs, as determined from sampled and/or non-sampled metrics, in terms of per-execution latency, execution frequency, and/or other performance metrics. The user may drill-down by selecting a query through the visualization to view more details about the query, such as additional performance metrics, information about which applications submitted the SQL, when the SQL was last executed, etc.

Figure 5:
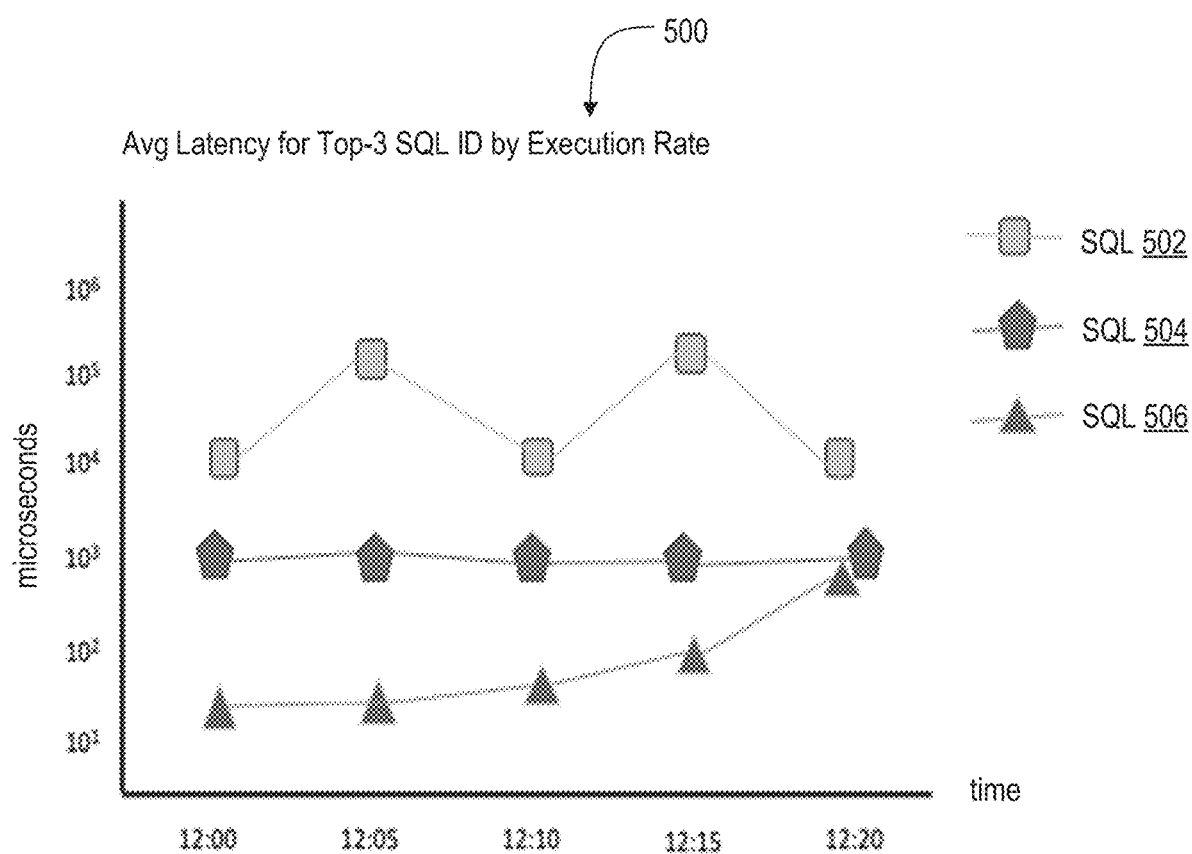
FIG. 5 illustrates an example chart for presenting query performance results in accordance with some embodiments.

FIG. 5 illustrates example chart 500 for presenting query performance results in accordance with some embodiments. Chart 500 depicts average execution latency time-series data for SQL 502, SQL 504, and SQL 506, which represent the top-3 SQL IDs by execution rate. Thus, the administrator may quickly identify, based on the visualization, a comparison of the stability and variance in performance over time for queries with the highest execution latencies and/or highest execution frequencies. A dashboard may allow the user to view chart 500 and/or other charts that are generated and rendered as a function of the performance metrics described herein. The user may navigate between different visualizations and/or drill-down on visualizations to gain insights into the overall performance of queries within database system 100.

4.5 Machine-Learning Applications

In some embodiments, artificial intelligence (AI), machine learning (ML), and deep learning applications may leverage the probabilistic performance metrics to perform actions and formulate predictions, insights, and recommendations. For example, AI applications may implement predictive, deterministic outcomes and recommendations based on streaming the performance metrics, ML applications may implement self-learning algorithms to extrapolate outcomes and recommendations, and deep learning applications may use neural networks to solve problems leading to poor query performance.

In an example ML application, ML engine 112 may train one or more ML models to predict whether query performance degradation is relevant to an administrator. ML engine 112 may receive a set of training examples where notifications were relevant and not relevant to an administrator. Each training example may include the estimated performance metrics and contextual data associated with the performance metrics. The training process may extract features associated with query, query performance metrics, and contextual data. For example, the training process may form a feature vector based on the SQL text, overall query workload, query execution plan, estimated average query latencies, and/or other features. The ML model that is trained may vary depending on the particular implementation. Examples include artificial neural networks, support vector machines (SVMs), and decision trees.

When monitoring new sample data, the ML model may be applied to predict if detected query performance degradation is relevant to a user. If so, then a notification may be sent to notify the user. With machine learning, the thresholds for triggering alerts are not hard coded into the system. Further, the thresholds may vary on account of various learned patterns. For example, an ML model may account for seasonal patterns, where higher execution latencies are expected due to seasonally recurring periods of high demand. A higher execution latency in such a period may not trigger an alert, whereas the same execution latency in a seasonal low period may be reported to the administrator as unusual.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates computer system 600 upon which some embodiments of the invention may be implemented. Computer system 600 includes bus 602 or other communication mechanism for communicating information, and a hardware processor 604 coupled with bus 602 for processing information. Hardware processor 604 may be, for example, a general-purpose microprocessor.

Computer system 600 also includes main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to some embodiments, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   probabilistically monitoring database activity by generating sample data for a set of one or more active database sessions at sample intervals, wherein the sample data is generated for a fraction of total database queries that are executed within a sample interval and are part of the database activity;
   identifying, in the sample data, a set of active database queries and sample counter values associated with the set of active database queries at different sample interval times, wherein the sample counter values include a first sample counter value that tracks executions of an individual database query at a first sample time and a second sample counter value that tracks executions of the individual database query at a second sample time;
   estimating, based at least on the sample counter values associated with the set of active database queries at the different sample interval times, one or more performance metrics for the set of active database queries, wherein estimating the one or more performance metrics for the set of active database queries includes computing a probabilistic performance metric for the individual database query using at least the first sample counter value and the second sample counter value, wherein the probabilistic performance metric is at least one of an estimated execution frequency or latency of the individual database query computed as a function of the first sample counter value and the second sample counter value; and
   generating, based at least in part on the one or more performance metrics for the set of active database queries, an alert indicative of performance degradation associated with at least one active database query in the set of active database queries.

2. The method of claim 1, further comprising: selecting the individual database query to track based at least in part on the one or more performance metrics indicative that the individual database query has a higher estimated performance impact than one or more other queries in the set of active database queries; and responsive to selecting the individual database query, tracking a set of non-sampled performance metrics associated with the individual database query.

3. The method of claim 1, further comprising: maintaining a plurality of execution counters, wherein each execution counter of the plurality of execution counters is mapped to a different query identifier; and sampling each execution counter of the plurality of execution counters for which an active query is detected at a sample interval rate.

4. The method of claim 1, wherein estimating the one or more performance metrics for the set of active database queries includes estimating at least one of database time consumed by one or more active database queries in the set of active database queries, an execution count within a particular timeframe for the one or more active database queries, or an average latency for the one or more active database queries.

5. The method of claim 1, further comprising: monitoring the one or more performance metrics for changes indicative of the performance degradation; wherein the alert is generated responsive to detecting at least one change indicative of the performance degradation.

6. The method of claim 5, wherein monitoring the one or more performance metrics for changes comprises monitoring estimated average latencies for changes; wherein the alert is generated responsive to detecting that a change in an estimated average latency for at least one active database query satisfies at least one threshold.

7. The method of claim 5, wherein monitoring the one or more performance metrics for changes comprises monitoring estimated execution frequencies for changes; wherein the alert is generated responsive to detecting that a change in an execution frequency for at least one active database query satisfies at least one threshold.

8. The method of claim 1, further comprising: generating an interactive visualization that compares stability of at least one active database query over time.

9. The method of claim 1, further comprising: tuning a database based at least in part on the one or more performance metrics for the set of active database queries.

10. One or more non-transitory computer-readable media storing instruction which, when executed by one or more hardware processors, cause:
    probabilistically monitoring database activity by generating sample data for a set of one or more active database sessions at sample intervals, wherein the sample data is generated for a fraction of total database queries that are executed within a sample interval and are part of the database activity;
    identifying, in the sample data, a set of active database queries and sample counter values associated with the set of active database queries at different sample interval times, wherein the sample counter values include a first sample counter value that tracks executions of an individual database query at a first sample time and a second sample counter value that tracks executions of the individual database query at a second sample time;
    estimating, based at least on the sample counter values associated with the set of active database queries at the different sample interval times, one or more performance metrics for the set of active database queries, wherein estimating the one or more performance metrics for the set of active database queries includes computing a probabilistic performance metric for the individual database query using at least the first sample counter value and the second sample counter value, wherein the probabilistic performance metric is at least one of an estimated execution frequency or latency of the individual database query computed as a function of the first sample counter value and the second sample counter value; and
    generating, based at least in part on the one or more performance metrics for the set of active database queries, an alert indicative of performance degradation associated with at least one active database query in the set of active database queries.

11. The media of claim 10, wherein the instructions further cause:
    selecting the individual database query to track based at least in part on the one or more performance metrics indicative that the individual database query has a higher estimated performance impact than one or more other queries in the set of active database queries; and
    responsive to selecting the individual database query, tracking a set of non-sampled performance metrics associated with the individual database query.

12. The media of claim 10, further comprising: maintaining a plurality of execution counters, wherein each execution counter of the plurality of execution counters is mapped to a different query identifier; and sampling each execution counter of the plurality of execution counters for which an active query is detected at a sample interval rate.

13. The media of claim 10, wherein estimating the one or more performance metrics for the set of active database queries includes estimating at least one of database time consumed by one or more active database queries in the set of active database queries, an execution count within a particular timeframe for the one or more active database queries, or an average latency for the one or more active database queries.

14. The media of claim 10, wherein the instructions further cause: monitoring the one or more performance metrics for changes indicative of the performance degradation; wherein the alert is generated responsive to detecting at least one change indicative of the performance degradation.

15. The media of claim 14, wherein monitoring the one or more performance metrics for changes comprises monitoring estimated average latencies for changes; wherein the alert is generated responsive to detecting that a change in an estimated average latency for at least one active database query satisfies at least one threshold.

16. The media of claim 14, wherein monitoring the one or more performance metrics for changes comprises monitoring estimated execution frequencies for changes; wherein the alert is generated responsive to detecting that a change in an execution frequency for at least one active database query satisfies at least one threshold.

17. The media of claim 10, wherein the instructions further cause: generating an interactive visualization that compares stability of at least one active database query over time.

18. The media of claim 10, wherein the instructions further cause: tuning a database based at least in part on the one or more performance metrics for the set of active database queries.

19. A system comprising:
    one or more hardware processors;
    one or more non-transitory computer-readable media storing instructions which, when executed by the one or more hardware processors cause:
        probabilistically monitoring database activity by generating sample data for a set of one or more active database sessions at sample intervals, wherein the sample data is generated for a fraction of total database queries that are executed within a sample interval and are part of the database activity;
        identifying, in the sample data, a set of active database queries and sample counter values associated with the set of active database queries at different sample interval times, wherein the sample counter values include a first sample counter value that tracks executions of an individual database query at a first sample time and a second sample counter value that tracks executions of the individual database query at a second sample time;
        estimating, based at least on the sample counter values associated with the set of active database queries at the different sample interval times, one or more performance metrics for the set of active database queries, wherein estimating the one or more performance metrics for the set of active database queries includes computing a probabilistic performance metric for the individual database query using at least the first sample counter value and the second sample counter value, wherein the probabilistic performance metric is at least one of an estimated execution frequency or latency of the individual database query computed as a function of the first sample counter value and the second sample counter value; and
        generating, based at least in part on the one or more performance metrics for the set of active database queries, an alert indicative of performance degradation associated with at least one active database query in the set of active database queries.

20. The system of claim 19, wherein the instructions further cause: tuning a database based at least in part on the one or more performance metrics for the set of active database queries.

* * * * *